United States Patent
Morrison et al.

(10) Patent No.: US 6,345,536 B1
(45) Date of Patent: Feb. 12, 2002

(54) MULTIPLE-PHASE FLOW METER

(75) Inventors: Gerald L. Morrison, College Station; James C. Holste, Bryan; Kenneth R. Hall, College Station, all of TX (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 09/151,253

(22) Filed: Sep. 10, 1998

(51) Int. Cl.[7] .................................................. G01F 1/74
(52) U.S. Cl. ...................................................... 73/861.04
(58) Field of Search ........................ 73/861.04, 861.61, 73/861.62, 195

(56) References Cited

U.S. PATENT DOCUMENTS

| | | | |
|---|---|---|---|
| 1,503,371 A | 7/1924 | Meyer | |
| 1,702,274 A | 2/1929 | Schmidt | |
| 1,923,118 A | 8/1933 | Ruder et al. | 137/112 |
| 2,687,645 A | 8/1954 | Velten et al. | 73/211 |
| 3,602,432 A | 8/1971 | Mulready | 239/265 |
| 3,750,710 A | 8/1973 | Hayner | 138/40 |
| 3,838,598 A | 10/1974 | Tompkins | 73/205 |
| 4,015,473 A | 4/1977 | Kleuters et al. | 73/205 |
| 4,040,293 A | 8/1977 | Wilson | 73/211 |
| 4,335,605 A * | 6/1982 | Boyd | 73/204 |
| 4,562,744 A | 1/1986 | Hall et al. | 73/861.02 |
| 4,592,390 A | 6/1986 | Boyd | 138/45 |
| 4,662,219 A * | 5/1987 | Nguyen | 73/195 |
| 4,800,754 A | 1/1989 | Korpi | 73/202 |
| 4,841,781 A | 6/1989 | Khalifa | 73/861 |
| 5,341,848 A | 8/1994 | Laws | 138/44 |
| 5,461,932 A * | 10/1995 | Hall et al. | 73/861.61 |
| 5,551,305 A * | 9/1996 | Farchi et al. | 73/861.04 |

FOREIGN PATENT DOCUMENTS

| EP | 0 684 458 A2 | 11/1995 | G01F/1/74 |
|---|---|---|---|

OTHER PUBLICATIONS

International PCT Report dated Jan. 24, 2000 for PCT/US99/20984 filed Sep. 10, 1999.

* cited by examiner

Primary Examiner—Benjamin R. Fuller
Assistant Examiner—Jewel V. Thompson
(74) Attorney, Agent, or Firm—Baker Botts L.L.P.

(57) ABSTRACT

This invention is related to flow meter instrumentation. More particularly, the invention is related to obstruction flow meters which are used in series in a flow conduit to determine the volume flow rate of liquid and gas phases of fluid flowing within the conduit. Multiple flow meters including at least one obstruction type flow meter are positioned serially within a flow conduit such as a pipe. Mathematical equations are developed for each flow meter based upon measured quantities and phase flow rates within the liquid stream. These equations are then solved simultaneously to obtain the desired phase flow rates. Two flow meters are used to determine the gas and liquid flow rates. Alternately three flow meters are used to determine the flow rates of a gas and two liquid phases.

24 Claims, 2 Drawing Sheets

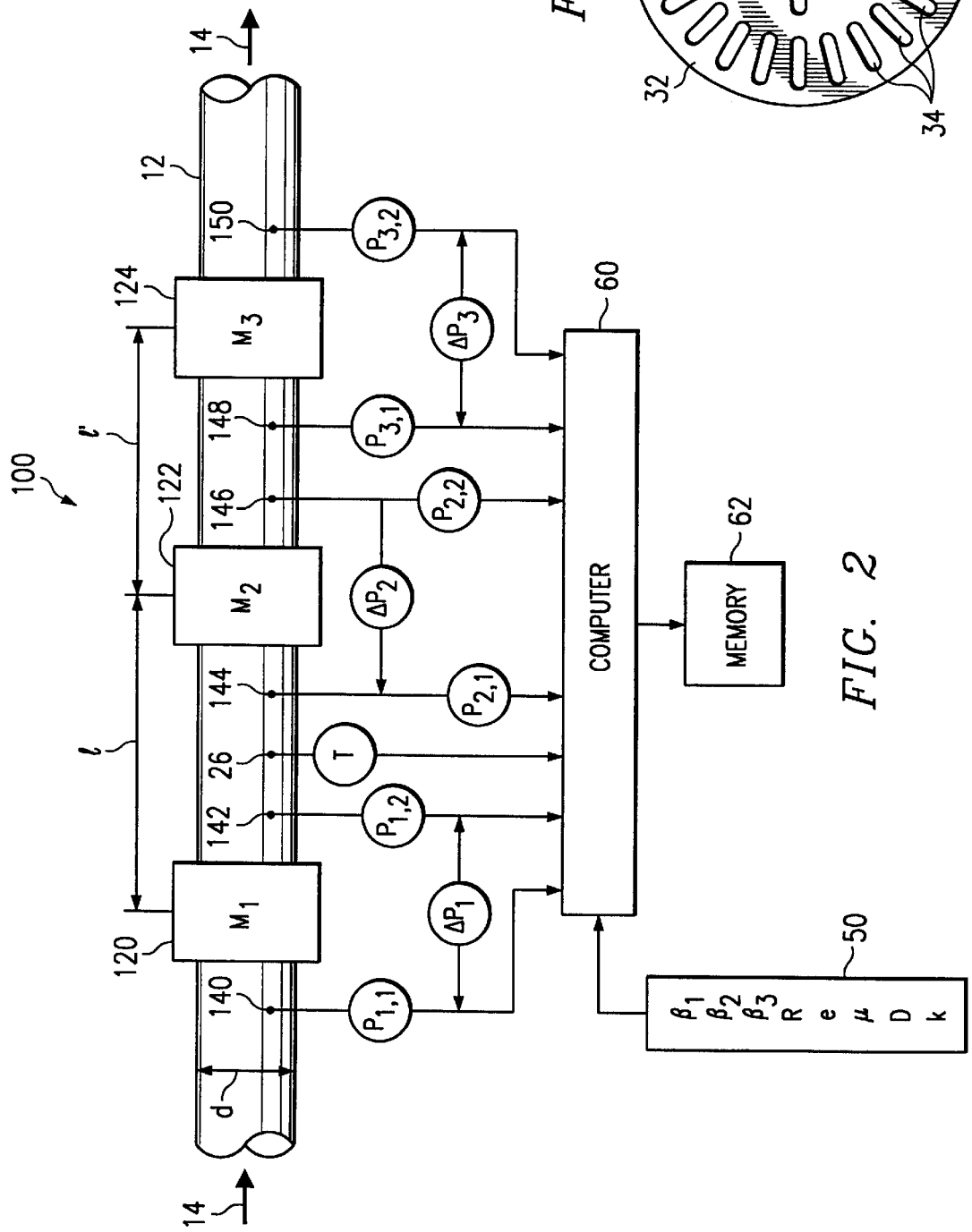

MULTIPLE-PHASE FLOW METER

BACKGROUND OF THE INVENTION

Fluid flow meters are used in many areas of industry and commerce. Various nuclear, acoustic, electromagnetic and mechanical techniques have been used to measure flow rate and volume flow rates of fluids containing one, two, or more components or "phases".

Obstruction type flow meters are widely used to measure single phase flow, such as fluids comprising 100% liquid or 100% gas. In orifice flow meters, fluid is forced to flow through an orifice in a plate within the flow conduit, creating a pressure drop across the plate. Orifice flow meters are relatively inexpensive to fabricate and maintain, and are reliable in many types of field operations. In addition, the physical size of most orifice devices is relatively small. Measurements of the differential pressure across the plate, along with fluid pressure and temperature measurements, are used to compute flow rate using equations well known in the art. Orifice flow measurements can be used to measure multiple-phase flow only if an independent measure of the ratio of the phases is made. Furthermore, accurate measurement of the volume flow rates of each phase can be obtained only if the linear flow velocities of the phases are the same, or the relative velocities or "slippage" of the linear phase flows can be determined, or all phases are forced to flow at the same linear flow rate at the position which the phase ratio and orifice plate measurements are made.

Positive displacement type flow meters force fluid to flow through a positive displacement meter such as a turbine apparatus, and the flow rate of the fluid is determined from the rate of revolution of the flow meter turbine. Positive displacement type flow meters may be used in multiple-phase flows. As with orifice flow meters, independent phase ratio measurements must be made using a variety of technologies, and assumptions must be made concerning the linear flow velocities of each of the phases in order to obtain accurate volume flow rates for the individual phases. Positive displacement type flow meters are more complex, more costly to manufacture and maintain, and are generally larger than orifice flow meters.

Separators are widely used in multiple-phase flow measurements. As an example, in the petroleum industry, it is of interest to measure volume flow rates of the three fluids produced: oil, gas and water. Gravity separators are widely used to separate these three components. The separated components are then drawn from the separator and single phase flow measurements are made on each of the separated components. Characteristically, separators are physically large, are expensive to construct, require a relatively long period of time for the multiple phases to separate by means of the force of gravity, and require separate flow meters and flow controllers for each separated phase.

Various two and three-phase "in-line" flow meters have been developed, especially in the petroleum industry. Relatively accurate three-phase "partition" measurements can be made using nuclear, acoustic, electromagnetic, and/or a combination of these technologies. However, a problem lies in accurately determining the flow velocities of each of the phases. Various relationships have been developed to calculate the relative or "slippage" velocity of two phases with respect to a measured third phase, but the calculations are replete with assumptions. In addition, these devices are usually quite complex both electronically and mechanically, are expensive to fabricate, and very expensive to maintain and calibrate.

Significant progress has been made recently in the area of single plate obstruction flow meters. U.S. Pat. No. 5,295,397 issued to Hall et al. on Mar. 22, 1994, and entitled "Slotted Orifice Flowmeter" ('397) discloses an orifice flow meter. The orifice plate is designed such that measurements are relatively insensitive to upstream and downstream flow conditions. In addition, the orifice plate is less disruptive in the manner in which it is used to impede flow. Therefore, fluid pressure recovers more readily within a shorter distance from the flow meter, and incurs less unrecoverable pressure drop than prior art orifice flow meters. Independent phase ratio measurements must be made, or assumptions directed toward the multiple phases must be made, in order to use the '397 device to measure volume flow rates in multiple-phase fluid flows. This patent is incorporated herein by reference.

U.S. Pat. No. 5,461,932 issued to Hall et al. on Oct. 31, 1995, and entitled "Slotted Orifice Flowmeter" ('932) discloses an orifice flow meter. A phase ratio sensor is used upstream from the orifice plate to allow two-phase flow measurements to be made without necessitating separation of the fluid. However, the phase ratio measurement is completely separate from the orifice flow meter measurement. This patent is incorporated herein by reference.

SUMMARY OF THE INVENTION

In one aspect of the present invention, a flow meter is provided for measuring the flow rate of each phase of a multiple-phase fluid in a conduit. Obstruction flow meters are serially positioned in a conduit and spaced a predetermined distance apart based upon the configuration of the orifice flow plate used in the obstruction flow meters. Sensors are also positioned in the conduit to measure the pressure and temperature of the multiple-phase fluid at various locations relative to the obstruction flow meters. The measurements are fed to a computer which calculates the flow rate of each phase of the multiple-phase fluid.

In another aspect of the present invention, a method is provided for measuring the flow rate of each phase of a multiple-phase fluid in a conduit. Obstruction flow meters are serially positioned in a conduit to create flow impedances. Pressures and the temperature of the multiple-phase fluid are measured at various locations relative to the obstruction flow meters. The measurements are then used to generate the flow rates of each phase of the multiple-phase fluid.

In another aspect of the present invention, a flow meter is provided for measuring a mixture of offshore petroleum products flowing in a conduit. Three obstruction flow meters are serially positioned in a conduit and spaced a predetermined distance apart based upon the configuration of the orifice flow plate used in the three obstruction flow meters. Sensors are also positioned in the conduit to measure the pressure and temperature of the mixture at various locations relative to the three obstruction flow meters. The measurements are fed to a computer which calculates the flow rate of each phase of the mixture. The flow rates are then stored in a memory device for future reference when determining royalty payments.

A primary technical advantage of the present invention is to provide multiple-phase flow measurements without the use of an independent phase ratio measurement.

Another primary technical advantage of the present invention is to provide a flowmeter and a method for calculating more accurate values of the Reynolds number of the fluid and the "quality" of the gas from pressure, temperature and differential temperature measurements made in the vicinity of the obstruction flow meters.

An additional technical advantage of the present invention is to provide a reliable, relatively inexpensive, compact means for measuring multiple-phase flow which is compatible with instrumentation of single-phase orifice flow meters, thereby eliminating the necessity to employ so exotic and/or expensive technologies such as sonic, nuclear, electromagnetic imaging, phase separation and the like to obtain multiple-phase measurements.

A still further technical advantage of the present invention is to provide a multiple-phase flow meter for offshore petroleum production operations where space on drilling and production platforms is at a premium, and reliability is of paramount importance.

Further advantages of the present invention may be appreciated upon examining the specification and claims below.

BRIEF DESCRIPTION OF THE DRAWINGS

For a better understanding of the present invention, reference may be made to the accompanying drawings, in which:

FIG. 2 is a schematic diagram of an embodiment of the present invention utilizing three obstruction flow meters serially disposed in a flow conduit; and FIG. 3 is a frontal view of a slotted orifice plate used in obstruction flow meters incorporated into the present invention.

DETAILED DESCRIPTION OF THE INVENTION

Figure 1:
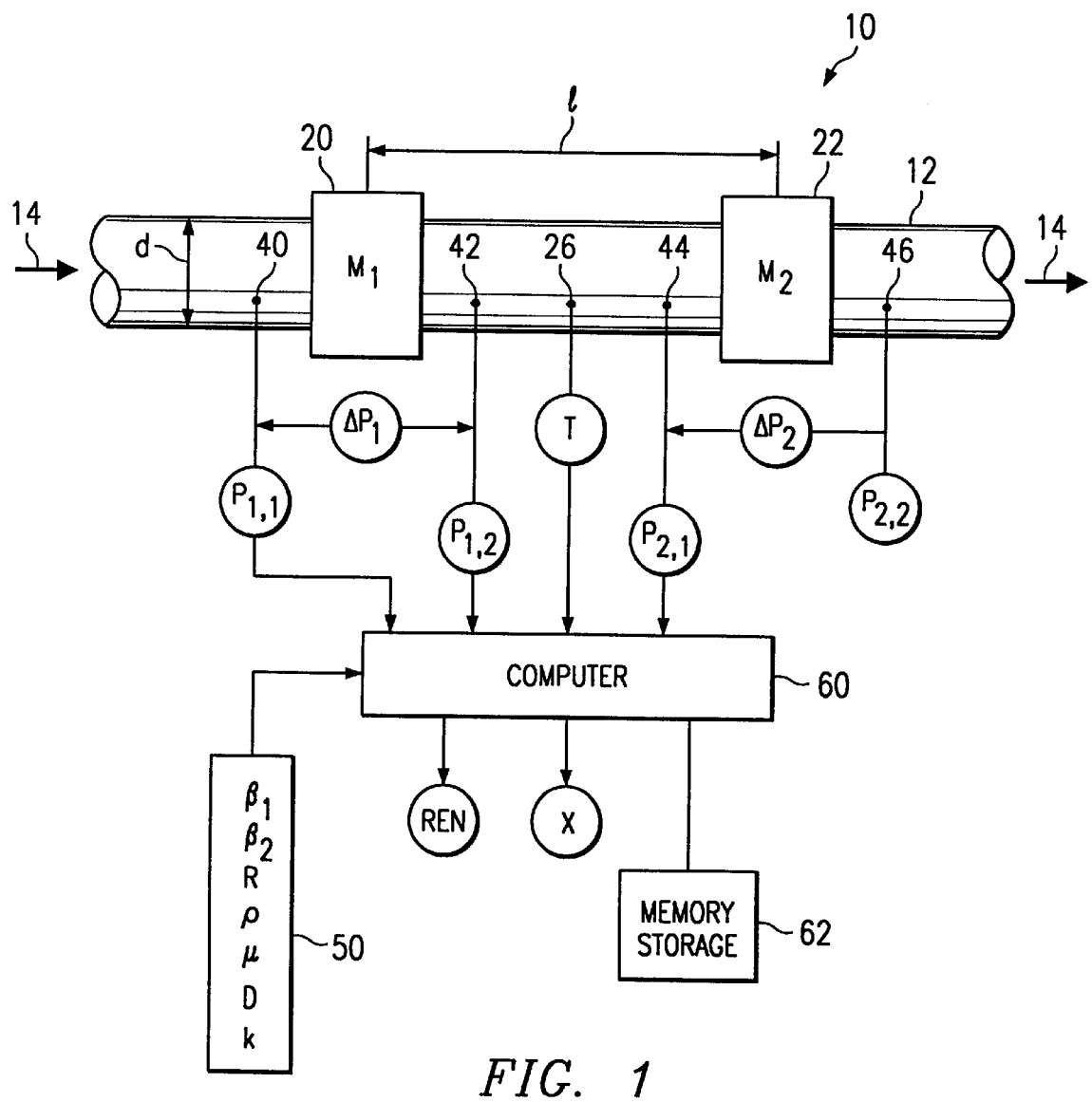
FIG. 1 is a schematic diagram of an embodiment of the present invention utilizing two obstruction flow meters serially disposed in a flow conduit.

The preferred embodiment of the present invention and its advantages are best understood by referring to FIGS. 1–3 of the drawings, like numerals being used for like and corresponding parts of the various drawings. Various parameters associated with the obstruction flow meters will be identified with the subscripts i=1, 2, etc.

With reference to the drawings, FIG. 1 is a schematic diagram of an embodiment of a multiple-phase flow meter 10 of the present invention. A fluid comprising a liquid phase and a gas phase flows through a cylindrical conduit 12, such as a pipe, in the direction indicated by arrows 14. The inside diameter of conduit 12 is denoted as the dimension d. Multiple-phase flow meter 10 includes a first flow meter 20 disposed in conduit 12, and is spaced a distance, 1, from a second flow meter 22 also disposed in conduit 12. The spacing, 1, is preferably several conduit diameters, d. At least one of the flow meters is an obstruction flow meter such as the type disclosed in U.S. Pat. Nos. 5,295,397 and 5,461,932, and may include a flow plate 30 of the type shown in FIG. 3.

Flow plate 30 is generally circular and contains a solid region 32. A series of spaced slots 34 are arranged on flow plate 30 to allow fluid to pass through. The ratio of the area of solid region 32 and the area of slots 34 is relatively constant over the entire flow plate 30. This ratio of areas is quantified by the term $\beta^2$. Flow plate 30 is positioned within conduit 12 such that the plane of flow plate 30 is substantially perpendicular to the major axis of conduit 12. The values, $\beta$, of obstruction flow meters 20 and 22 differ preferably by approximately 0.05 or more. As an example, typical beta values are $\beta_1=0.50$ for first obstruction flow meter 20 and $\beta_2=0.43$ for second obstruction flow meter 22, yielding a $\beta$ difference of 0.07.

Still referring to FIG. 1, multiple-phase flow meter 10 further includes pressure sensors 40 and 42 which measure pressure upstream ($P_{1,1}$) and downstream ($P_{1,2}$), respectively, with respect to first obstruction flow meter 20. These pressure measurements are provided as input into a computer 60. In a similar fashion, pressure sensors 44 and 46 are disposed on either side of second obstruction flow meter 22 and measure pressure upstream ($P_{2,1}$) and downstream ($P_{2,2}$), respectively, with respect to second obstruction flow meter 22. These measured pressures are also input into computer 60. In addition, a temperature sensor 26 measures fluid temperature, T, which is also input into computer 60. Temperature sensor 26 may be positioned anywhere in the fluid flow.

Other parameters which are either known or obtained from independent measurements are symbolically shown in box 50 of FIG. 1. These include quantities $\rho$, $\mu$, k, D, R, $\beta_1$, $\beta_2$, and are defined below. These parameters are also input into computer 60. Once all measured and known parameters have been input into computer 60, the Reynolds number, Re, and the gas quality, x, are computed. Likewise, the flow rate of the gas and liquid phases are determined from the Reynolds number by computer 60. The details of the computation are set forth below. The calculated values may be output to a memory storage device 62, which may be a chart recorder or a digital recording device.

In an alternate embodiment of the present invention, with reference to FIG. 1, second obstruction flow meter 22 is omitted and replaced with a densitometer. The density measurement of a mixture of liquid and gas (of known density in the pure condition) enables solution of the term x. If that term is known, then the Reynolds number is extracted from a single set of data from first obstruction flow meter 20.

The present invention is not limited to the measurement of the flow of two phases within a fluid. As an example, the present invention can be embodied to measure the phases of two liquids and a gas phase in the fluid, provided that the physical properties such as density and viscosity differ. With reference to the drawings, FIG. 2 is a schematic diagram of this embodiment of the present invention. A fluid comprising two liquid phases and a gas phase flows through cylindrical conduit 12 with inside diameter, d, in the direction indicated by arrows 14. Multiple-phase flow meter 100 includes a first obstruction flow meter 120 disposed in conduit 12, and is spaced a distance, 1, from a second obstruction flow meter 122 also disposed in conduit 12. Second obstruction flow meter 122 is spaced a distance, 1', from a third obstruction flow meter 124. The spacings, 1 and 1', are preferably several conduit diameters, d. Obstruction flow meters 120, 122 and 124 may be of the type disclosed in U.S. Pat. Nos. 5,295,397 and 5,461,932, as discussed above.

Still referring to FIG. 2, multiple-phase flow meter 100 further includes pressure sensors 140 and 142 which measure pressure upstream ($P_{1,1}$) and downstream ($P_{1,2}$), respectively, with respect to first obstruction flow meter 120. These pressure measurements are provided as input into computer 60. Similarly, pressure sensors 144 and 146 are disposed on either side of second obstruction flow meter 122 and measure pressure upstream ($P_{2,1}$) and downstream ($P_{2,2}$), respectively, with respect to second obstruction flow meter 122. These measured pressures are also input into computer 60. In addition, pressure sensors 148 and 150 are disposed on either side of third obstruction flow meter 124 and measure pressure upstream ($P_{3,1}$) and downstream ($P_{3,2}$), respectively, with respect to third obstruction flow meter 124. These measured pressures are also input into computer 60. Also, a temperature sensor 26 measures fluid temperature, T, which is also input into computer 60.

Other parameters which are either known or obtained from independent measurements are symbolically shown in the box 50 of FIG. 2. These include quantities $\rho$, $\mu$, k, D, R, $\beta_1$, $\beta_2$, $\beta_3$ and are defined below. These parameters are also input into computer 60. Once all measured and known parameters have been input into computer 60, the Reynolds number, Re, and the gas quality, x, are computed for each phase. Likewise, the flow rate of the gas phase and two liquid phases are determined from the Reynolds number by computer 60.

The preferred obstruction flow meters are disclosed in the previously referenced U.S. Pat. Nos. 5,295,397 and 5,461,932. Among other attributes, the design of flow plate 30 generates flow characteristics of a fluid such that, after passing through a first obstruction flow meter, rapidly recover prior to passing through a second obstruction flow meter, with the exception of minimal nonrecoverable pressure drop. The flow characteristics are also very insensitive to upstream flow conditions. Because the obstruction flow meters of the present invention are disposed in series in conduit 12, the flow plates 30, with their superior fluid flow recovery properties and insensitivities to upstream flow conditions, can be spaced relatively close to minimize the overall dimensions of the multiple-phase flow meter of the present invention. Spacing of the obstruction flow meters is generally a few conduit diameters, d, apart.

Alternatively, other types of flow meters may be employed in the present invention so that only one or more flow meter is an obstruction-type flow meter. For example, vortex meters, Venturi meters, Coriolis meters and the like could replace the second and/or third flow meters in the series.

In a specific embodiment of the present invention, it will be observed that only N+1 pressure measurements are required, where N equals the number of obstruction flow meters. Using the two obstruction flow meter embodiment as an example, absolute pressure measurements may be made upstream of first obstruction flow meter 20, between first and second obstruction flow meters 20 and 22, and downstream of second obstruction flow meter 22. In an alternative approach, only one absolute pressure measurement need be made at any of the location of pressure sensors 40, 42, 44 or 46. Assume for purposes of discussion that pressure sensor 40 is the absolute pressure gauge. Then, two other pressure measurements are made and they can either be absolute measurements or can be differential pressure measurements. In either instance, the pressure drop is measured across first and second obstruction flow meters 20 and 22.

Recall that multiple-phase flow meter 10 of the present invention uses the response of obstruction flow meters operating in series to obtain the flow rate of a multiple-phase fluid. In the following mathematical description of the present invention, the subscript "i" where i=1 and 2, will be used to identify various parameters associated with first obstruction flow meter 20 and second obstruction flow meter 22, respectively. These calculations are equally applicable to multiple-phase flow meter 100.

The Reynolds number, Re, of the gas portion of the fluid flowing through an obstruction type flow meter can be expressed as:

$$Re = x[C_{d,i}(x,Re)Y_i D \beta_i^2 (2\rho_i \Delta P_i)^{1/2}]/[\mu(1-\beta_i^4)]^{1/2} \tag{1}$$

where
x = the gas quality;
$C_{d,i}$ = the discharge function;
D = the diameter of the conduit 12;
$\beta_i$ = square root of the ratio of the total open area of all openings divided by the cross-sectional area of the flow plate 30;
$\mu$ = the viscosity of the gas;
$\Delta P_i$ = the differential pressure drop across the ith obstruction flow meter;
$\rho_i = P_i/(R\ T)$; and
$Y_i$ = expansion factor where
$P_i$ = the absolute pressure in the flow stream in the vicinity of the obstruction flow meter i;
T = the temperature of the fluid;
R = the specific gas constant; and
$k = C_p/C_v$ = the ratio of specific heats for the gas.

It has been determined that generalized functions $Cd_{,1}$ and $Cd_{,2}$, which are dependent upon Re and x, can be expressed as functions of selected constants with Re and x.

$$Cd_{,1} = f(a_1, b_1, c_1, d_1, Re, x); \text{ and} \tag{2}$$

$$Cd_{,2} = f(a_2, b_2, c_2, d_2, Re, x) \tag{3}$$

where the empirical constants are determined under known flow conditions for a particular configuration of flow plates 30. The quantities $\beta_i$ are known from the design parameters of the flow plates 30 of first and second obstruction flow meters 20 and 22. The quantities $Y_i$ are derived from metered calibrations. The quantities $\rho_i$ are calculated from measured quantities $P_{i,i}$, T, and from a known quantity R defined above. The quantity $\mu$ is also known as defined above. Therefore, the terms in Equation (1) are known with the exception of the Reynolds number of the fluid, Re, and the quality of the gas, x.

Equation (1) with i=1,2, may be solved iteratively for Re and x by starting with an initial guess of these quantities, as will be illustrated in a following example. The solution yields the Reynolds number of the gas and the quality of the gas/liquid mixture. A mass flow rate, m, of the gas can be calculated from the expression $$m = (Re \pi D \mu)/4 \tag{4}$$

Volume flow rates of the liquid and gas phases can then be obtained from m, x, and the densities of each phase.

The following known and measured parameters will be used to illustrate the determination of Re and x using the previously described methodology. $f_1(Re,x)$ and $f_2(Re,x)$ will represent discharge functions $C_{d,i}(Re,x)$ through series orifice plates i=1,2. This example was performed under known conditions in which the true values of Re and x were known. The measured and known parameters were:

$\rho H_2O = 62.4$ lb ft/sec$^2$ $\mu = 3.875\ 10^{-7}$ lbf sec/ft$^2$
k = 1.4
R = 53.35 ft lbf/lb deg
$\beta_i = 0.50$
$P_1 = 24.2$ psi
$\Delta P_1 = 9.83$ in of $H_2O$
$\rho_i = 0.123$ lb/ft$^3$
$Y_1 = 0.995$
$a_1 = 2.3712846$ $b_1 = -4.9048095 \ 10^{-7}$ $c_1 = 2.4584207$ $d_1 = 0.887817$ $D = 2.067$ in.

$\beta_2 = 0.43$ $P_2 14.5$ psi $\Delta P_2 = 19.21$ in. of $H_2O$ $\rho_2 = 0103$ lb/ft$^3$ $Y_2 = 0.991$ $a_2 = 1.6272073$ $b_2 = -3.6012949 \ 10^{-6}$ $c_2 = 1.1792148 \ 10^{-11}$ $d_2 = -0.68470117$ Starting with initial values of Re=50,000 and x=0.5, the solution of Equation (1) converges at Re=5.46 10$^4$ and x=0.881. This compares quite favorably with the true values of Re=5.47 10$^4$ and x=0.8987, illustrating the accuracy and robustness of the present invention.

As a further illustration of the robustness and consistency of the present invention, the solutions Re and x are substituted into generalized Equations (2) and (3), expressed as discharge functions, to yield calculated discharge function values of:

$$C_{d,1} = a_1 + b_1 Re + c_1 x + d_1 x^2 = 0.869 \tag{5}$$

$$C_{d,2} = a_2 + b_2 Re + c_2 Re^2 + d_2 x = 0.863 \tag{6}$$

These calculated values compare favorably with experimental data of $C_{d,1}=0.8498$ and $C_{d,2}=0.8441$. Note the two equations are application specific and represent one type of analysis. Other constants can be developed for alternate specific forms of equations.

To put the foregoing into context, consider several oil wells which are drilled in a particular field. The wells usually flow a mixture of water, oil and gas. For purposes of discussion, assume the fluid flow consists only of oil and gas. It is not uncommon for the pressure in the producing formation to be sufficiently high so that the gas is dissolved in the oil. Therefore, the oil itself tends to carry the dissolved gas along as an adequate pressure is maintained, but the gas will come out of the oil depending on agitation, prevailing temperatures, pressure and other terms which are less significant than those. Moreover, as the field produces over a long interval of time, the ratio can change markedly. In other words, the amount of natural gas produced may change significantly over months or years. The total volumetric production will also change. For these reasons, it is important to know the relative mix of the two fluids (oil and natural gas).

Assume, therefore, that several wells are producing into a 6" diameter gathering line. Assume further that the production from the field must be measured and measurements transferred once each month for determination of royalties to be paid to the land owners. The royalties typically are given by a formula which provides different royalty rates for the produced natural gas and the oil. To accomplish this, memory storage device 62 is connected to computer 60 so that measurements can be output and stored for the month. These measurements will be distinctly more accurate than those that have been accepted in the industry in the past. It has been common in the industry to use a circular paper disk connected with a clock so that the line marked on the disk represents the flow for one revolution of the disk. The disk is normally rotated once per day, once per week, or once per month. The disk must be serviced to avoid marking a second line over the first line; this requires disk removal at the end of one disk interval of time (i.e., one disk is assigned to each day, week or month). That requires the difficulty of servicing in the field. The old disk is removed and taken to a measuring facility where the area under the curve is measured, thereby representing the integrated flow through that particular measuring device for that time interval. That is represented as so many barrels of oil in a week, or so many standard cubic feet of natural gas in a time interval such as a week.

As will be seen, an easily implemented set of measurements (only pressure and temperature) may be used in determining the flow of the oil and gas. This flow through the gathering line can be output to memory storage device 62, and that memory can be interrogated daily, weekly or monthly as required.

The present invention operates most efficiently when the percent of liquid in the fluid is in the 0–80% range. For liquid content below 20%, "slugs" of 100% liquid tend to flow within the pipeline, especially if the pipeline undulates with terrain. Low points in the pipeline can act as liquid traps and thereby create the liquid slugs. Liquid slugs can damage flow meters, especially if the linear flow velocity of the slugs is large. Such slugging derives from the fluid context and does not indicate any defect of the present system.

Referring to the two obstruction flow meter embodiment, relationships can be developed which are dependent on four variables: T, P, $\Delta P_1$ and $\Delta P_2$. More specifically in observing only first obstruction flow meter 20, it will be understood that an equation of the generalized form can be developed. Two such equations are given because there are two obstruction flow meters; these are generally set forth in the form of equations (7) and (8):

$$C_{d,1} = f_1(T,P,\Delta P_1 \text{ and } \Delta P_2) \tag{7}$$

$$C_{d,2} = f_2(T,P,\Delta P_1 \text{ and } \Delta P_2) \tag{8}$$

These functional equations can then be viewed simply as two equations dealing with two unknowns and are solved to obtain solutions which are robust and consistent over a reasonable range of product flow through the two obstruction flow meters. As a practical matter, the two obstruction flow meters can thus provide measurements based upon four measured variables (T, P, and $\Delta P_1$ and $\Delta P_2$). As will be understood, the development shown in equations (7) and (8) represents a more generalized case than that of equations (2) and (3). This suggests significant benefits and advantages in viewing the system in this manner. The precise nature of the functional relationship given in equations (7) and (8) can be that which was developed earlier but other empirical relationships can likewise be developed for use as equations (7) and (8).

Referring to the three obstruction flow meter embodiment, relationships can be developed which are dependent on five variables: T, P, $\Delta P_1$, $\Delta P_2$ and $\Delta P_3$. The system can be generalized mathematically as three equations of the form $$C_{d,1} = f_1(T,P,\Delta P_1,\Delta P_2,\Delta P_3) \tag{9}$$

$$C_{d,2} = f_2(T,P,\Delta P_1,\Delta P_2,\Delta P_3) \tag{10}$$

$$C_{d,3} = f_1(T,P,\Delta P_1,\Delta P_2,\Delta P_3) \tag{11}$$

where the subscripts i=1,2,3, represent first, second and third obstruction flow meters 120, 122 and 124. These equations, and the simultaneous solutions for three unknowns (e.g., oil, water and gas flow) are analogous to the two obstruction flow meter embodiments discussed previously and expressed mathematically in generalized equations (7) and (8). Solutions for the oil, water and gas phases are possible because the physical properties of each phase, such as the density and viscosity, differ, and therefore result in distinctive responses in each of obstruction flow meters 120, 122 and 124. The simultaneous solution of Equations (9) through (11) is obtained using computer 60. These equations are effective for volumetric quantification and are also effective for mass flow rate.

While the foregoing disclosure is directed to specific embodiments of the present invention, other and further embodiments of the invention may be devised without departing from the basic scope thereof, and the scope thereof is determined by the claims which follow.

What is claimed is:

1. A multiple-phase flow meter for measuring a multiple-phase flow in a conduit, comprising:
    at least N flow meters including at least one obstruction flow meter serially disposed in the conduit so that the at least N flow meters each have an upstream side and a downstream side, and any two adjacent flow meters have an intermediate region therebetween;
    a plurality of sensors located upstream, downstream, and in the intermediate region of the at least N flow meters, the plurality of sensors measuring predetermined characteristics of the multiple-phase flow;
    a computer operatively coupled to the plurality of sensors, and operable to determine a Reynolds number and a gas quality of the multiple-phase flow based on the predetermined characteristics; and
    wherein the computer determines the Reynolds number and the gas quality by solving two instances of the generalized equation:

$$Re = x[C_{d,i}(x,Re)Y_i D \beta_i^2 (2\rho_i \Delta P_i)^{1/2}]/[\mu(1-\beta_i^4)]^{1/2}$$

for two unknown variables, wherein i is the index number of the obstruction flow meters considered, Re is the Reynolds number, x is the gas quality, $C_{d,i}$ is a discharge coefficient, D is a diameter of the conduit, $\beta_i$ is the square root of a ratio of the total open area of the plurality of openings in the plate divided by the cross-sectional area of the plate, $\mu$ is a viscosity of the gas, $\Delta P_i$ is a differential pressure drop across the ith obstruction flow meter, $\rho_i$ is $P_i/(R*T)$, $Y_i$ is an expansion factor, and wherein $P_i$ is an absolute pressure in the multiple-phase fluid in the vicinity of the ith obstruction flow meter, T is the temperature of the multiphase fluid, R is a specific gas constant, and $k=C_p/C_v$ is a ratio of specific heats for the gas.

2. The multiple-phase flow meter of claim 1 wherein the at least one obstruction flow meter comprises a plate with a plurality of openings defined therein, the plurality of openings arranged in a predetermined pattern.

3. The multiple-phase flow meter of claim 2 wherein the plurality of openings on the plate comprise:
    a first series of openings positioned in an inner circle, the first series of openings having a combined area, the inner circle having a surface area;
    a second series of openings positioned in a ring concentric to the inner circle, the second series of openings having a combined area, the ring having a surface area; and
    a first ratio of the combined area of the first series of openings to the inner circle surface area being substantially the same as a second ratio of the combined area of the second series of openings to the ring surface area.

4. The multiple-phase flow meter of claim 2 wherein the plurality of openings on the plate comprise:
    at least two concentric series of openings positioned in at least two concentric circular areas on the plate, the openings of each of the at least two concentric series of openings having a combined area, the at least two concentric circular areas each having a surface area; and
    ratios of the combined area of each of the at least two concentric series of openings to its respective circular area surface area being substantially the same.

5. The multiple-phase flow meter of claim 1 wherein the at least N flow meters comprises a first obstruction flow meter and a second obstruction flow meter, wherein the plurality of sensors comprise a first pressure sensor disposed in the upstream side of the first obstruction flow meter, second and third pressure sensors disposed in the intermediate region between the first and second obstruction flow meters, a fourth pressure sensor disposed in the downstream side of the second obstruction flow meter, and a temperature sensor disposed in the conduit.

6. The multiple-phase flow meter of claim 1 wherein the at least N flow meters comprises a first obstruction flow meter and a second obstruction flow meter, wherein the plurality of sensors comprises a first pressure sensor disposed in the upstream side of the first obstruction flow meter, a second pressure sensor disposed in the intermediate region between the first and second obstruction flow meters, a third pressure sensor disposed in the downstream side of the second obstruction flow meter, and a temperature sensor disposed in the conduit.

7. The multiple-phase flow meter of claim 1 wherein the at least N flow meters comprises first, second and third obstruction flow meters, wherein the plurality of sensors comprises a first pressure sensor disposed in the upstream side of the first obstruction flow meter, second and third pressure sensors disposed in the intermediate region between the first and second obstruction flow meters, fourth and fifth pressure sensors disposed in the intermediate region of the second and third obstruction flow meters, a sixth pressure sensor disposed in the downstream side of the third obstruction flow meter, and a temperature sensor disposed in the conduit.

8. The multiple-phase flow meter of claim 1 wherein the at least N flow meters comprises first, second and third obstruction flow meters, wherein the plurality of sensors comprises a first pressure sensor disposed in the upstream side of the first obstruction flow meter, a second pressure sensor disposed in the intermediate region between the first and second obstruction flow meters, a third pressure sensor disposed in the intermediate region of the second and third obstruction flow meters, a fourth pressure sensor disposed in the downstream side of the third obstruction flow meter, and a temperature sensor disposed in the conduit.

9. The multiple-phase flow meter of claim 1 wherein the at least N flow meters comprises an obstruction flow meter and at least one non-obstruction flow meter, wherein the plurality of sensors comprise a first pressure sensor disposed in the upstream side of the obstruction flow meter, second and third pressure sensors disposed in the intermediate region between the obstruction flow meter and the at least one non-obstruction flow meter, a fourth pressure sensor disposed in the downstream side of the at least one non-obstruction flow meter, and a temperature sensor disposed in the conduit.

10. The multiple-phase flow meter of claim 9 wherein the at least one non-obstruction flow meter is a vortex meter.

11. The multiple-phase flow meter of claim 9 wherein the at least one non-obstruction flow meter is a Venturi meter.

12. The multiple-phase flow meter of claim 9 wherein the at least one non-obstruction flow meter is a densitometer.

13. The multiple-phase flow meter of claim 1 further comprising a memory device operatively coupled to the computer.

14. A method for measuring a multiple-phase flow of a fluid in a conduit, comprising:

measuring at least one pressure and a temperature of the fluid;

measuring at least one pressure differential of the fluid across each of at least N flow meters including at least one obstruction flow meter serially disposed in the conduit;

calculating at least one discharge coefficient ($C_d$), at least one Reynolds number (Re), and at least one gas quality (x) of the multiple-phase fluid;

generating a flow rate of each phase of the multiple-phase fluid from the Reynolds number (Re) and the gas quality (x) of the multiple-phase fluid; and wherein the at least one Reynolds number and at least one gas quality calculating step comprises solving two instances of the generalized equation:

$$Re = x[C_{d,i}(x,Re)Y_i D \beta_i^2 (2\rho_i \Delta P_i)^{1/2}]/[\mu(1-\beta_i^4)]^{1/2}$$

for two unknown variables, wherein i is the index number of the obstruction flow meters considered, Re is the Reynolds number, x is the gas quality, Cd,i is the discharge coefficient, D is a diameter of the conduit, $\beta_i$ is the square root of a ratio of the total open area of the plurality of openings in the plate divided by the cross-sectional area of the plate, $\mu$ is a viscosity of the gas, $\Delta P_i$ is a differential pressure drop across the ith obstruction flow meter, $\rho_i$ is $P_i/(R^*T)$, $Y_i$ is an expansion factor, and wherein $P_i$ is an absolute pressure in the multiple-phase fluid in the vicinity of the ith obstruction flow meter, T is the temperature of the multiple-phase fluid, R is a specific gas constant, and $k=C_p/C_v$ is a ratio of specific heats for the gas.

15. The method, as set forth in claim 14, wherein the at least one obstruction flow meter comprises a plate with a plurality of openings defined therein, the plurality of openings arranged in a predetermined pattern.

16. The method, as set forth in claim 14, wherein the at least one discharge coefficient calculating step comprises solving an equation wherein each of the at least one discharge coefficients is a function of the at least one pressure, the temperature, and the at least one pressure differential.

17. A method for measuring a multiple-phase flow of a fluid in a conduit, comprising:

measuring at least one pressure and a temperature of the fluid;

measuring at least one pressure differential of the fluid across each of at least N flow meters including at least one obstruction flow meter and one densitometer serially disposed in the conduit;

measuring a density of the fluid;

calculating at least one discharge coefficient ($C_d$), at least one Reynolds number (Re), and at least one gas quality (x) of the multiple-phase fluid;

generating a flow rate of each phase of the multiple-phase fluid from the Reynolds number (Re) and the gas quality of the multiple-phase fluid; and wherein the at least one Reynolds number and at least one gas quality calculating step comprises solving two instances of the generalized equation:

$$Re = x[C_{d,i}(x,Re)Y_i D \beta_i^2 (2\rho_i \Delta P_i)^{1/2}]/[\mu(1-\beta_i^4)]^{1/2}$$

for two unknown variables, wherein i is the index number of the obstruction flow meters considered, Re is the Reynolds number, x is the gas quality, Cd,i is the discharge coefficient, D is a diameter of the conduit, $\beta_i$ is the square root of a ratio of the total open area of the plurality of openings in the plate divided by the cross-sectional area of the plate, $\mu$ is a viscosity of the gas, $\Delta P_i$ is a differential pressure drop across the ith obstruction flow meter, $\rho_i$ is $P_i/(R^*T)$, $Y_i$ is an expansion factor, and wherein $P_i$ is an absolute pressure in the multiple-phase fluid in the vicinity of the ith obstruction flow meter, T is the temperature of the multiple-phase fluid, R is a specific gas constant, and $k=C_p/C_v$ is a ratio of specific heats for the gas.

18. A multiple-phase flow meter for measuring a mixture of offshore petroleum products flowing in a conduit, comprising:

three flow meters including at least two obstruction flow meters serially disposed in the conduit so that each of the three flow meters have an upstream side and a downstream side, and any two adjacent flow meters have an intermediate region therebetween;

a plurality of sensors located upstream, downstream, and in the intermediate region of the three flow meters, the plurality of sensors measuring predetermined characteristics of the multiple-phase flow;

a computer operatively coupled to the plurality of sensors, and operable to determine a Reynolds number and a gas quality of the multiple-phase flow based on the predetermined characteristics;

a memory device operatively coupled to the computer; and wherein the computer determines the Reynolds number and the gas quality by solving two instances of the generalized equation:

$$Re = x[C_{d,i}(x,Re)Y_i D \beta_i^2 (2\rho_i \Delta P_i)^{1/2}]/[\mu(1-\beta_i^4)]^{1/2}$$

for two unknown variables, wherein i is the index number of the obstruction flow meters considered, Re is the Reynolds number, x is the gas quality, $C_{d,i}$ is a discharge coefficient, D is a diameter of the conduit, $\beta_i$ is the square root of a ratio of the total open area of the plurality of openings in the plate divided by the cross-sectional area of the plate, $\mu$ is a viscosity of the gas, $\Delta P_i$ is a differential pressure drop across the ith obstruction flow meter, $\rho_i$ is $P_i/(R^*T)$, $Y_i$ is an expansion factor, and wherein $P_i$ is an absolute pressure in the multiple-phase fluid in the vicinity of the ith obstruction flow meter, T is the temperature of the multiple-phase fluid, R is a specific gas constant, and $k=C_p/C_v$ is a ratio of specific heats for the gas.

19. The multiple-phase flow meter of claim 18 wherein each of the three flow meters comprises a plate with a plurality of openings defined therein, the plurality of openings arranged in a predetermined pattern.

20. The multiple-phase flow meter of claim 19, wherein the plurality of openings on the plate comprise:

at least two concentric series of openings positioned in at least two concentric circular areas on the plate, the openings of each of the at least two concentric series of openings having a combined area, the at least two concentric circular areas each having a surface area; and ratios of the combined area of each of the at least two concentric series of openings to its respective circular area surface area being substantially the same.

21. The multiple-phase flow meter of claim 18 wherein at least one flow meter is a vortex meter.

22. The multiple-phase flow meter of claim 18 wherein at least one flow meter is a Venturi meter.

23. The multiple-phase flow meter of claim 18 wherein at least one flow meter is a densitometer.

24. A multiple-phase flow meter for measuring a multiple-phase flow in a conduit, comprising:
   at least N flow meters including at least one obstruction flow meter serially disposed in the conduit so that the at least N flow meters each have an upstream side and a downstream side, and any two adjacent flow meters have an intermediate region therebetween;
   a plurality of sensors located upstream, downstream, and in the intermediate region of the at least N flow meters, the plurality of sensors measuring predetermined characteristics of the multiple-phase flow;
   a computer operatively coupled to the plurality of sensors, and operable to determine a Reynolds number and a gas quality of the multiple-phase flow based on the predetermined characteristics;
   wherein the at least one obstruction flow meter comprises a plate with a plurality of openings defined therein, the plurality of openings arranged in a predetermined pattern; and
   wherein the computer determines the Reynolds number and the gas quality by solving two instances of the generalized equation:

$$Re = x[C_{d,i}(x,Re)Y_i D\beta_i^2(2\rho_i \Delta P_i)^{1/2}]/[\mu(1-\beta_i^4)]^{1/2}$$

for two unknown variables, wherein i is the index number of the obstruction flow meters considered, Re is the Reynolds number, x is the gas quality, $C_{d,i}$ is a discharge coefficient, D is a diameter of the conduit, $\beta_i$ is the square root of a ratio of the total open area of the plurality of openings in the plate divided by the cross-sectional area of the plate, $\mu$ is a viscosity of the gas, $\Delta P_i$ is a differential pressure drop across the ith obstruction flow meter, $\rho_i$ is $P_i/(R^*T)$, $Y_i$ is an expansion factor, and wherein $P_i$ is an absolute pressure in the multiple-phase fluid in the vicinity of the ith obstruction flow meter, T is the temperature of the multiple-phase fluid, R is a specific gas constant, and $k=C_p/C_v$ is a ratio of specific beats for the gas.

* * * * *